United States Patent [19]

Gross et al.

[11] Patent Number: 4,495,143
[45] Date of Patent: Jan. 22, 1985

[54] GAS TAGGING AND COVER GAS COMBINATION FOR NUCLEAR REACTOR

[75] Inventors: Kenny C. Gross, Lemont, Ill.; Matthew T. Laug, Idaho Falls, Id.

[73] Assignee: The United States of America as represented by the United States Department of Energy, Washington, D.C.

[21] Appl. No.: 535,462

[22] Filed: Sep. 26, 1983

[51] Int. Cl.³ .............................................. G21C 17/04
[52] U.S. Cl. .................................... 376/251; 376/250; 376/253
[58] Field of Search ............... 376/251, 253, 310, 312, 376/313, 314, 250

[56] References Cited

U.S. PATENT DOCUMENTS

| | | | |
|---|---|---|---|
| 3,632,470 | 1/1972 | Rubin et al. | 376/251 |
| 4,012,490 | 3/1977 | Lofredo | 376/312 |
| 4,135,970 | 1/1979 | Mitsutsuka et al. | 376/253 |
| 4,347,214 | 8/1982 | Sato et al. | 376/251 |

OTHER PUBLICATIONS

Handbook of Applied Engineering Science (1970), pp. 27-29, Bolz et al.

*Primary Examiner*—Sal Cangialosi
*Attorney, Agent, or Firm*—Charles F. Lind; James W. Weinberger

[57] ABSTRACT

The invention discloses the use of stable isotopes of neon and argon, that are grouped in preselected different ratios one to the other and are then sealed as tags in different cladded nuclear fuel elements to be used in a liquid metal fast breeder reactor. Failure of the cladding of any fuel element allows fission gases generated in the reaction and these tag isotopes to escape and to combine with the cover gas held in the reactor over the fuel elements. The isotopes specifically are $Ne^{20}$, $Ne^{21}$ and $Ne^{22}$ of neon and $Ar^{36}$, $Ar^{38}$ and $Ar^{40}$ of argon, and the cover gas is helium. Serially connected cryogenically operated charcoal beds are used to clean the cover gas and to separate out the tags. The first or cover gas cleanup bed is held between approximately 0° and $-25°$ C. operable to remove the fission gases from the cover gas and tags and the second or tag recovery system bed is held between approximately $-170°$ and $-185°$ C. operable to isolate the tags from the cover gas. Spectrometric analysis further is used to identify the specific tags that are recovered, and thus the specific leaking fuel element. By cataloging the fuel element tags to the location of the fuel elements in the reactor, the location of the leaking fuel element can then be specifically determined.

8 Claims, 4 Drawing Figures

GAS TAGGING AND COVER GAS COMBINATION FOR NUCLEAR REACTOR

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

A typical nuclear reactor includes a core within which chain-reacting nuclear fuel material is located. The fuel material typically might be pellets of $U^{235}$ or $U^{238}$ or $Pu^{239}$ which are encased in separate corrosion resistant heat conductive cans or cladding to form an elongated fuel element (also referred to as a fuel rod or fuel pin). A number of the fuel elements are grouped together and supported within a larger fuel assembly. The fuel assemblies are located then in a prearranged spaced matrix within the core of the reactor, with moderators or other form of control means being located in a different prearranged matrix within the core. The controlled presence of the fuel elements and control means regulate the extent of the nuclear reaction whereby neutron bombardment provides for thermal heating of the fuel elements and surrounding core structures. A reactor coolant is circulated through the core and fuel assemblies and over the fuel elements so as to cool them. The reactor coolant in turn is passed through a heat exchanger whereby a second coolant, commonly steam or water, is heated which second coolant is then expanded through appropriate steam expansion equipment for producing useful output typically for generating electricity.

Each fuel element, as noted, has a sealed exterior can or cladding, typically of stainless steel or zirconium alloy, so that the fuel material itself is sealed therein and is isolated from the coolant. This is needed firstly, to chemically isolate the nuclear fuel material from the coolant, and secondly to prevent the release of any radioactive fission products that may be generated in the nuclear reaction. Failure of the cladding, such as by localized melting or cracking, may thus release such fission products which would radioactively contaminate the circulating coolant which then would interfere with plant operation and maintenance. Further, a leaking fuel element could be the result of swelling that in turn further might block coolant flow and cause more extensive or costly overheating damage to the reactor. Thus, it is desirable to identify and locate a leaking fuel element as soon as possible so that the situation can be appraised and that fuel replacement procedures can be quickly handled with a minimal degree of cost and effort during subsequent reactor shutdown.

Most modern power reactors, particularly the breeder reactor where a liquid metal (sodium, for example) is used as the reactor coolant, have a sealed reactor system with an inert cover gas, typically argon that serves as a collector for any fission gases carried in the circulating coolant. To remove the fission gases, the cover gas must be removed from the reactor and processed in a cover gas cleanup system, such as in a bed of charcoal held at a cryogenic temperature, whereby the purified cover gas is then returned to the reactor. The fission gases commonly include the radioactive isotopes of xenon and krypton. This cleanup system can be operated continuously or only after a leaking fuel element has been detected.

A gamma ray radiation detector is commonly used to examine the cover gas for the presence of any of the gaseous fission products. However, this has little accuracy in identification specifics, so that further identification of the leaking fuel element and evaluation of the severity of the leak must still be made by other means.

Systems are being used to sample the cover gas and/or the coolant circulating in the reactor in an attempt to localize the leaking fuel element. The use of "sippers" has worked moderately well, whereby a portion of the coolant from selected fuel assemblies would be diverted to a remote sampling facility; and a multiple port valve would be shifted to periodically sample the coolant output from different proximate fuel assemblies. This system, however, does require prior assemblied clusters of coolant lines and valves, so it would not be practical in most existing power reactors not having the required hardware.

The concept of gas tagging is also known, being taught, for example, in the U.S. Pat. No. 3,632,470 assigned to General Electric Company; and U.S. Pat. Nos. 3,663,363 and 3,746,614 assigned to the U.S. Government. In gas tagging, stable isotopes of a gas are isolated in proportioned percentages of concentration to one another as a means for establishing unique combinations of such isotopes. The unique combinations of such isotopes, along with a filler gas perhaps of helium, would then be sealed within the different fuel elements as they were manufactured. The filler gas might comprise perhaps 90% of the gas mixture and would provide effective heat transfer between the fuel material and the fuel element cladding. The different fuel elements with their unique tags would be cataloged according to some matrix in the reactor core. Upon a breach of fuel element cladding, the unique "tag gas" mixture would escape to the coolant and would ultimately be carried to the cover gas area. Mass spectrometric analysis of the cover gas would give the weighted presence of the isotopes, and therefore identify the unique "tag gas". The corresponding fuel assembly "leaker" might then be identified according to the matrix catalog.

U.S. Pat. No. 3,632,470, proposes using the three stable non-radioactive isotopes of neon: $Ne^{20}$, $Ne^{21}$ and $Ne^{22}$. However, the teaching has been inoperative in practice because the mass of the cover gas atoms (which typically is argon) to that of the neon tag gas atoms, is almost two to one. Thus, a doubly ionized argon isotope ($Ar^{40++}$) looks almost identical on a mass spectrometer to a singly ionized neon isotope ($Ne^{20+}$), and a precise analysis is difficult if not impossible to make.

U.S. Pat. No. 3,663,363 proposed using the xenon 124-130 isotopes as the tags. Although these isotopes would not normally be among the fission products generated in the reaction, the xenon 131-136 isotopes and the krypton 83-86 isotopes are the most common gaseous fission products. Consequently, the tag detecting system must attempt to isolate tag and fission isotopes from the same xenon family, which in effect greatly dilutes the concentration of the tag isotopes. Where the cover gas cleanup system is operated continuously, this in effect means that is is competing with the tag gas recovery and detecting systems for the same xenon isotopes. When the cover gas cleanup system can be stopped and only the tag gas recovery system operated, the xenon tags are diluted by the background blanket of fission product xenon and it becomes increasingly difficult to separate the tags from the fission gas. Notwithstanding these shortcomings, tag detecting systems of this type have been used in several liquid metal fast breeder reactors with varying degrees of success for many years.

While helium and argon have been proposed for possible use as the cover gas in the liquid metal fast breeder reactor, in practice argon has been used almost 100% of the time as the cover gas because of the relative ease of containment. The only gases suitable as failure "tags" in fuel assemblies are the noble gases of xenon, krypton, argon and neon. The argon cover has precluded the use of argon tags because of course, the tag isotopes could not be detected against the huge background of natural argon. As noted, neon tags cannot be used because the presence of doubly-ionized argon in the mass spectrometer interferes with the ability to resolve the neon tags. For these reasons, most tagging systems propose using either isotopes of xenon, or mixtures of isotopes of xenon and krypton. The high cost and complexity of xenon or xenon/krypton tags discourage their use in large-scale reactors where 600–800 unique tags would be required.

Furthermore, xenon is very difficult to extract from air, and by far the most difficult to enrich isotopically by thermal diffusion columns. This is so since as the atomic mass increases, the fractional difference in mass between adjacent isotopes becomes smaller. While $Xe^{128}$ can be produced in essentially pure form by transmutation of iodine in a thermal nuclear reactor (albeit at a large expense), there exist only a finite number of enrichments for the remaining stable isotopes. Thus, the maximum mole percent attainable in commercially available enrichments is 40% for $Xe^{124}$, 16% for $Xe^{126}$, and 70% for $Xe^{129}$. Moreover, for any given enrichment of one of these isotopes, the relative ratios of the remaining isotopes are essentially fixed.

These considerations impose severe physical constraints on the range of unique tag compositions that can be obtained with a xenon or xenon-krypton system of tags.

Another and most significant drawback on the xenon/krypton tag system is that when a fuel element has ruptured and fission gases have been detected the cover-gas cleanup system must run continuously to strip out the radioactive xenon and krypton fission gases. This means that any released tags of xenon or krypton will be subject to this cleanup system and likely disappear completely within a short time, viz., less than a few hours. Thus, if a tag is missed for some reason during this brief time, it is likely that the leaker which released that tag will not be identified.

Yet another drawback with xenon and xenon/krypton tags is that the principal tag ratios change substantially upon irradiation in the reactor. The most common two ways of dealing with these large changes, both of which increase the cost of tagging, are: (1) to track the compositions of every tag in the reactor by analytical and empirical means as a function of irradiation history; and (2) to provide sufficient spacing between adjacent tag ratios so that no tag can "burn into" a neighboring tag during irradiation. This required wide spacing of the xenon/krypton tags has the added drawback of using much more of the most expensive isotopes.

U.S. Pat. No. 3,746,614 use the three stable isotopes of $Au^{197}$, $Sb^{121}$, and $Pt^{198}$ in slightly different weight ratios to one another as part of the bond coating over sodium bonded fuel elements. Thus the unique tag ratios of the different fuel elements can be identified by gamma spectrometric assay, and a fuel element tagging catalog can be used to pinpoint the element location in the reactor core. However, the coolant must leak through a failed cladding and contact the fuel element coating before the resulting tag would be released to flow with the coolant past the detecting area; and as the tag is a solid, the system is almost completely insensitive to a gas leaker.

SUMMARY OF THE INVENTION

This invention teaches an improved combination of cover gas and tagging means for use in a liquid metal fast breeder reactor for monitoring a large number of separate fuel assemblies arranged in a matrix configuration in a common reactor core, the invention providing improved sensitivity and discrimination in specifically isolating and locating a leaking fuel assembly within the matrix.

This invention uses separate charcoal beds respectively maintained at different cryogenic temperatures for isolating from the cover gas impurities including the fission gas and tagging gas isotopes respectively that escape from a sealed fuel element upon failure of the fuel element cladding, detecting means including gas spectrometry to identify the isolated tagging gas isotopes, and the invention specifically uses the unique combination of helium as the cover gas and neon and argon isotopes as the tagging gas isotopes.

The invention specifically provides using the stable isotopes $Ne^{20}$, $Ne^{21}$ and $Ne^{22}$ of neon and the stable isotopes $Ar^{36}$, $Ar^{38}$ and $Ar^{40}$ of argon in preselected different ratios one to the other so as to define many unique combinations of such tagging isotopes. Each distinct tagging combination is thereupon sealed in a fuel element with the fuel material; although similarly tagged fuel elements could be made and located in a common fuel assembly. Breach of the fuel element cladding thereby allows the unique tagging gas combination contained within that fuel element and the generated fission gases to escape and to combine with the cover gas. The cover gas is directed initially to the cover gas cleanup system whereby the fission gas impurities are first separated from the cover gas and most of the cleaned cover gas can then be recirculated back to the reactor; and part of the cleaned cover gas is then directed to the gas tag recovery system whereby the tag gases are isolated from the cleaned cover gas. The isolated tag gases can then be directed to mass spectrometry or other equivalent analysis for identifying the unique tag combination of the leaking fuel element which, along with the mapped matrix of the fuel assemblies, locates the leaking fuel element in the reactor core. In this manner, the fission gases and the tagging gases of neon and argon are independently isolated and separated from the cover gas of helium by noncompeting systems to provide improved sensitivity and accuracy in identifying the tagging isotopes.

The advantages of the helium cover, argon-neon tagging combination include low gas costs, high tag-ratio stability, improved mass spectrometer detection sensitivity, favorable heat transfer consideration, lack of competition between the cover gas cleanup and tagging gas isolation systems, and analysis of tagging gases free of radioactive fission gases.

Another attractive feature of neon and argon isotopes is that both gases have very small neutron capture cross sections and essentially zero fission yields for either uranium or plutonium fission. Thus neon-argon tag ratios are expected to change very little during irradiation in reactor. With the high neutronic stability and low capture resonances for fast and intermediate energy neutrons, (1) no analytical corrections will probably be required for the argon/neon tag systems; (2) tag ratios can be spaced more closely together, with a considerable cost savings; and (3) the reliability of identifying failures should be tremendously enhanced, particularly when compared with present xenon/krypton tag compositions and neutronics correction procedures.

Neon and argon isotopes are more easily resolved with a mass spectrometer than xenon/krypton isotopes, simply because the fractional difference in mass for two adjacent isotopes of these lighter gases is larger than for either heavier gas of xenon or krypton. Moreover, the background signal on the mass spectrometer due to non-tag noble gas isotopes is much smaller for neon and argon than for fission-produced and tramp-produced xenon and krypton "background" gases. As a result, greater sensitivity will likely be obtained with a mass spectrometer instrument when using a neon-argon tag system compared to using the xenon-krypton tag system.

Moreover, neon and argon typically have significantly higher thermal conductivity values at all temperatures when compared to the higher-mass isotopes of krypton and xenon. Although the quantity of tag gas loaded into the fuel element generally has not been limited on the grounds of heat transfer, there is less restriction on the quantity of neon and argon that can be added to each fuel element, than for xenon and krypton.

The cost per liter for neon and argon isotopes are in most cases substantially less than for the more conventionally used xenon and krypton isotopes, perhaps only 5 or 10% as much—particularly considering the same relative spacing between tag nodes.

The cover gas cleanup system can be operated continuously or only after a leak has occurred in a subassembly. With the neon-argon tags, it is possible to have the cover gas cleanup system operated continuously where the radioactive fission isotopes will be removed from the cover gas, and without significantly removing or otherwise reducing the concentration of the tag isotopes. The tagging gas collecting system can then be operated on the cleaned cover gas to remove or recover the tag gas isotopes for analysis. Moreover as the tags are basically unaffected by the cover gas cleanup system, the tag gas concentration can be allowed to buildup in the cover gas before activating the tag recovery system, thus assuring that an adequate sample concentration is isolated for accurate identification. Moreover, if some malfunction (e.g., sample contamination, errant mass spectrometer or computer readout, etc.) did occur, subsequent tag gas samples can be taken until a satisfactory analysis is made. Only then need the tag gas be purged from the cover gas.

DETAILED DESCRIPTION OF THE PREFERRED EMBODIMENT

Figure 1:
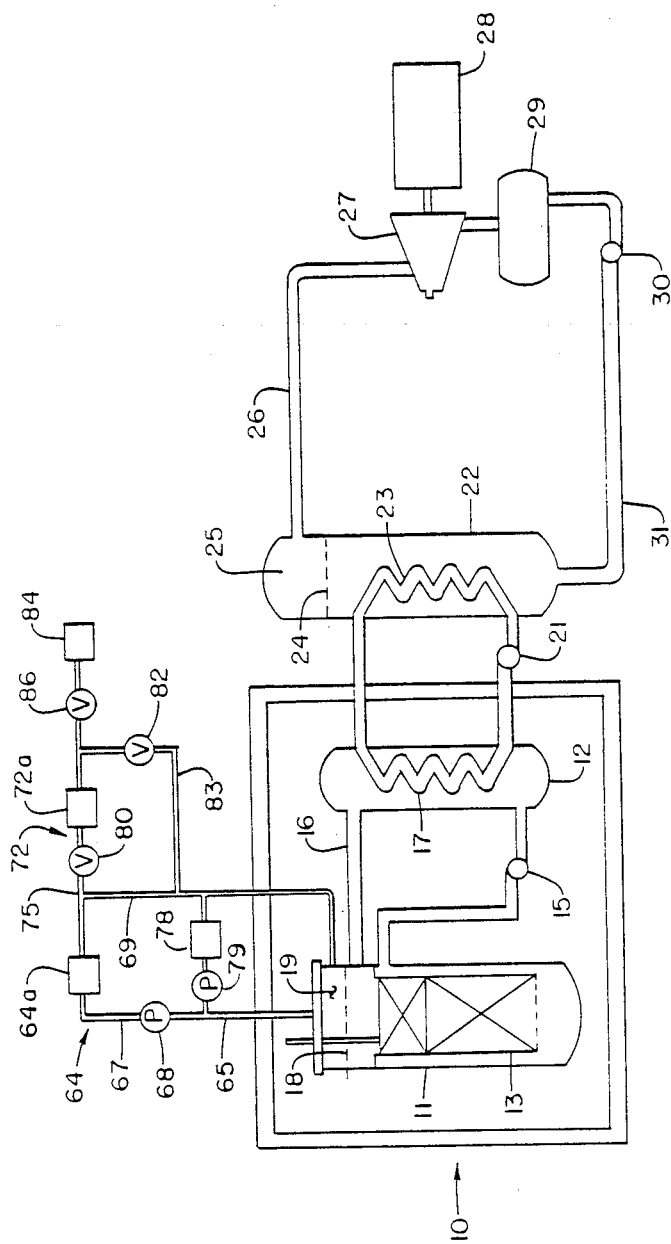
FIG. 1 is a schematic illustration of a reactor and its coolant circuitry, and showing specifically a preferred embodiment of the subject invention.

FIG. 1 illustrates a containment 10 enclosing a nuclear reactor 11 and a heat exchanger 12. A core 13 made up of a honeycomb array of open-ended passageways 14 (see FIG. 4) is in the reactor. Nuclear fuel "F" is designed to be located in certain of the core passageways according to some predetermined pattern or matrix, as is approximated in FIG. 4. Control rods or other conventional neutron absorbing control devices "C" are also designed to be fitted into other specific core passageways, again according to a specific matrix or pattern. The control devices "C" most typically are raised or lowered relative to the core 13 to establish a certain presence relative to the nuclear fuel "F", which allows fission reaction to proceed and generate heat in the core due to the bombardment of neutrons.

To cool the reactor core as well as obtain heat useful for generating electrical power, molten sodium as a reactor coolant is circulated by pump 15 into the reactor 11 where it passes first downwardly in an annular space between the core 13 and the wall of reactor 11 and then upwardly through the passageways 14 of the reactor core 13, and via line 16 to the heat exchanger 12. The reactor sodium gives up heat to a second stream of molten sodium isolated in heat exchanger coil 17 and is circulated then back to reactor 11 through pump 15. The surface level of the molten sodium in the reactor 11 is indicated by dashed line 18, and a cover gas fills the space 19 over the sodium in the reactor.

The heater second stream of sodium in heat exchanger coil 17 is circulated by pump 21 through steam generator 22 where in coil 23 it gives off its heat to water to produce steam. The water level in the steam generator 22 is indicated by the dashed line at 24, and the steam in the space 25 above the water surface passes through line 26 to turbine 27 which drives electrical generator 28. Steam leaving turbine 27 is condensed in condenser 29 and pumped by pump 30 through line 31 back to the steam generator 22.

The reactor 11 and heat exchanger 12 have been greatly simplified in FIG. 1 for clarity, where in practice they are mechanically complex. From time to time it is necessary to open the reactor for refueling. In the liquid metal cooled reactor, these operations are difficult because the sodium must be maintained above its melting temperature and is a hazardous material to handle. Radioactive material leaking from the nuclear fuel in core 13 will contaminate the sodium coolant, heat exchanger 12 and associated pumps and piping; the radioactive contamination making these maintenance operations even more difficult.

Figure 4:
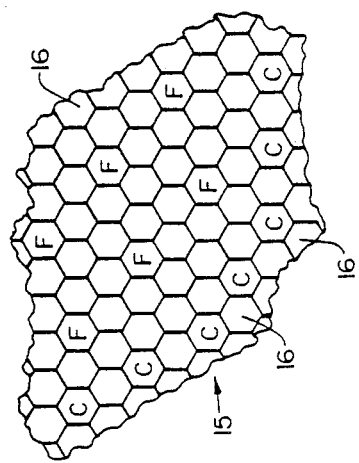
FIG. 4 is a partial cross sectional view of a typical reactor core (FIG. 1) illustrating the passageways within which fuel assemblies of the type illustrated in FIG. 2 are located according to a predetermined matrix.
Figure 2:
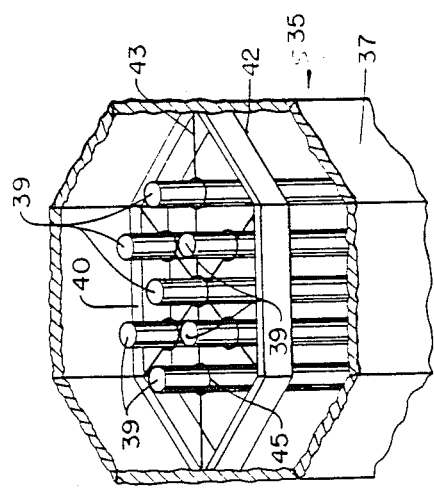
FIG. 2 is a perspective view partly broken away for clarity of illustration, of a typical fuel assembly to be located in the reactor core shown in FIG. 1, the assembly being formed of a plurality of individual fuel elements as illustrated in FIG. 3.

As noted, FIG. 4 shows a schematic representation of a horizontal section through the reactor core 13 of FIG. 1 including typical matrix arrangements of the nuclear fuel "F" and the control means "C" therein. The nuclear fuel "F" is generally housed in a fuel assembly 35 (see FIG. 2) shown here having an exterior hexagonal can 37, although any other suitable cross section, such as square rectangular, etc., might be used to fit within the correspondingly shaped core passageways 14. The fuel assembly 35 illustrated is comprised of seven generally parallel separate fuel rods or elements 39 supported in spaced parallel relation within the hexagonal can 37, one element being adjacent each corner of the hexagonal can and one element being at the center. At least two grid supports 40 (only one being shown) are used for holding the separate fuel elements 39 within the can 37, the grid support illustrated including a band 42 secured to the periphery of the can 37 and cross webs 43 which connect between the band 42 and separate collars 45 located on the individual fuel elements. The can 37 is open at its opposite ends (not shown) so that coolant can be readily passed axially through the can from one open end to the other within the core passageway, and the open spacing between the webs allow the coolant to pass axially along and over the fuel elements 39.

Figure 3:
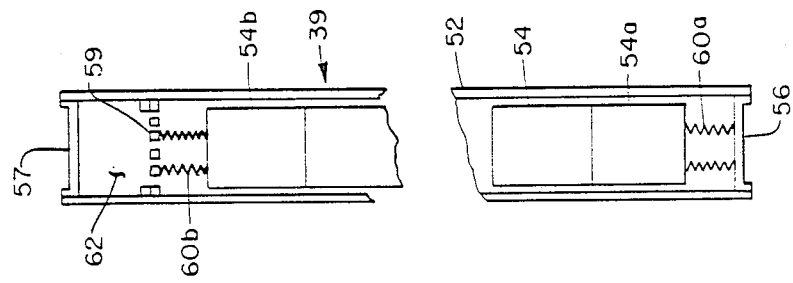
FIG. 3 is a sectional view of a typical fuel element that is located in the fuel assembly of FIG. 2.

FIG. 3 illustrates a typical fuel element 39, which in a commercial reactor would consist of cylindrical can or cladding 52 extended between two and six feet in length and having maybe only 0.25" to 0.5" inside diameter. A plurality fuel pellets 54, each likewise of generally cylindrical shape, are fitted within the can or cladding 52 stacked solid one against the other endwise for almost the entire length of the cladding. The cladding is closed by end caps 56 and 57 welded to the opposite ends thereof, where further there is provided a perforated intermediate wall 59 which is located adjacent the end cap 57. Spring devices 60a, 60b are interposed between the end cap 56 and the perforated intermediate wall 59, and the endmost fuel element pellets 54a, 54b operable to bias the fuel pellets snuggly against one another. The fuel pellets 54 themselves are of a smaller overall outer diameter than the inner diameter of the cladding 52 so that some radial clearance is provided and gas migration can occur axially along and within the fuel element 39 from one end to the other.

The space 62 between the end cap 57 and intermediate wall 59 is known as the gas plenum and initially during fabrication this plenum 62 is pressurized with tag gases in a preprogrammed proportion. As noted, the fuel element 39 is sealed so that the tagging gas and all fusion gases generated by later reaction of the fuel pellets 54 are confined within the fuel element, but can migrate freely along the entire length of the fuel element.

In accordance with the disclosed invention, a cover gas clean up system 64 is connected by lines 65 and 67 and pump 68 from cover gas space 19 and returned by line 69 back to the reactor space 19. A tag recovery and analysis system 72 is located downstream of the cleanup system 64, off tee 75 in line 69, and thus sees only the cover gas cleaned of the fission gases. A fission gas detector or alarm system 78 is included with pump 79, typically in a parallel hookup with the cover gas cleanup system 64, and is used continuously to detect for the presence of fission gases in the cover gas. Thus, operation of the pump 79 provides a small continuous sample of the cover gas for analysis by the detector system 78. The cover gas cleanup system 64 may operate continuously upon operation of pump 68, but otherwise it will be operated upon detection of fission gases in the cover gas.

The tag recovery and analysis system 72 includes a means for recovering the tags and a means for analyzing the recovered tags. The recovery system is separated from the gas return line 69 by a valve 80, and is connected also then through valve 82 and line 83 back to the reactor via line 69. The analysis apparatus 84 is connected through valve 86 off of the recovery system. The tag recovery system is operated with the valves 80 and 82 open and valve 86 closed, and only when fission gases are detected in the cover gas and only when the cover gas cleanup system is operated. Thus all of the fission gases are removed in the cover gas clean up system 64, and a portion of the cleaned cover gas is continuously or intermittently passed through the tag recovery system 72. The tag analysis system 84 is operated generally with the valves 80 and 82 closed and valve 86 opened, and typically includes a mass spectrometer (not shown) to appraise of the specific tags present. The output of the mass spectrometer frequently is printed in graphic form. Only a small fraction of the cover gas passed through the tag recovery and analysis system 72 is consumed in the analysis, the remainder is returned to cover gas space 19 via lines 83 and 69.

Both the cover gas cleanup system 64 and the tag recovery system 72 would include a bed of charcoal through which the gas including the impurities to be removed or recovery are passed. The specific construction of the charcoal bed is immaterial to this invention (being shown as 64a and 72a in the schematic), but each is operated at a specific cryogenic temperature. Thus the fission gases will be absorbed out of the cover gas in cryogenic bed 64a and the tag gases of neon and argon will be adsorbed out of the cover gas in the cryogenic bed 72a.

In this invention, it is contemplated to use helium as the cover gas, and neon and argon as the tag gases. Specifically, the three stable isotopes of neon, namely, $Ne^{20}$, $Ne^{21}$, and $Ne^{22}$, and the three stable isotopes of argon namely, $Ar^{36}$, $Ar^{38}$ and $Ar^{40}$ are to be used where by concentrating the percentage of any one or more of such tag isotopes, it would be possible to define many separate, unique and distinct proportions of tagging combinations. The tag combinations can be comprised solely of the neon isotopes, solely of the argon isotopes, or blends of each. The separate combinations of tags will be injected into the fuel elements where all fuel elements of a specific fuel assembly would have the same tag, and the differently-tagged fuel assemblies would be at the different locations within the reactor matrix. Thus, the later specific identification of such a tag gas combination in the mass spectrometer would provide the unique identity and thus the location of the "leaker" fuel element. The separation by abundance of the varying isotopes in a mass spectrometer is all conventional.

In the normal operation, the cover gas cleanup system cryogenic bed 64a would be operated between approximately 0° and −25° C., for example, while the tag gas recovery bed 72a would be operating in the range of −170° to −185° C. The cover gas along with any tag gases and fission gases would be directed through the cyrogenic charcoal bed 64a and via line 69 back to the reactor. Impurities including the fission gases would be adsorbed from the cover gas in the cover gas cleanup system bed 64a. Part of the purified cover gas (still including the tags) would then be passed through the tag recovery charcoal bed 72a, which is effective to adsorb from the cover gas the neon and argon tag gas isotopes used, while the cover gas of helium passes back to the reactor.

In a preferred embodiment, the tag recovery and analysis system 72 is made up of three separate similarly arranged series of beds 72a and analysis apparatus 84

(only the one being shown) so that each series can be operated by itself and can be alternately in a batch format, while yet providing for continuous collection. Thus, while one series of apparatus is operating at cryogenic temperatures collecting the gases, the second is being heated to perhaps between 150° and 200° C. to drive off the collected gases for transfer to the analysis apparatus, and the third is being cooled down to the cryogenic temperatures for collecting again. In like manner multiple cover gas cleanup beds 64a can be used (only one bed being shown) to allow regeneration and/or even replacement of an individual bed while the others of the overall system are yet operating. Flow through each tag recovery and analysis system bed or series of beds, and/or through the cover gas clean up system beds will normally be controlled automatically by a timed/temperature sequence of valve operation.

Also, a preferred tag recovery bed 72a might actually include a primary tag bed and a secondary tag bed (neither being shown specifically) located in a series flow connection, whereby the collected tag isotopes in the primary bed would be driven off by heat and recollected in a higher concentration in the secondary bed held again at approximately $-170°$ to $-185°$ C. Transfer from the primary tag bed to the secondary tag bed would begin when the valving had been shifted to redirect the cover gas to the next sequential primary bed and the cover gas flow into the original primary bed had been stopped. Clean helium gas could be admitted to backflush the charcoal in the primary tag bed while it is being cooled down. The effluent from the tag bed can be directed to a precooled evacuated sample vial or the like (not shown) in the analysis apparatus 84. The sample vial could either be removed from the system and transported in a shielded container to a laboratory for analysis, or the sample could be directed to an on-line mass spectrometer (not shown). Liquid nitrogen normally surrounding the sample vial would be boiled off to increase the vial temperature to about 50° C. to drive the tag gases through the mass spectrometer. The identity of adsorbed tag gases can be used then with the matrix mapping of the specifically tagged fuel assemblies within the reactor to locate the leaking fuel element.

Of particular interest to this invention is the fact that the cover gas cleanup system 64 and the tag recovery and analysis system 72 are operating independently of one another and do not compete with one another. This is of particular importance as the fission gases that escape into the cover gas are different from any of the tag gases. Moreover, the cover gas cleanup system bed 64a is in a series connection with and is operated upstream of the tag recovery system bed 72a and can be operated most efficiently toward removing the greatest percentage of such fission gases. The tag gases of neon and argon are not significantly adsorbed by the cleanup system bed 64a but pass with the cleaned cover gas of helium on through to the tag recovery bed 72a. On the other hand, the downstream tag recovery bed 72a, being operated at much cooler cryogenic temperatures ($-170°$ to $-185°$ C. versus 0° to $-25°$ C.) collect the lighter tag gases of neon and argon but allow the cleaned cover gas of helium to pass through and back to the reactor.

One major advantage of the disclosed reactor system having the helium cover gas and the unique blends of neon and argon tag isotopes is the overall lower cost of the system. In fact, it may be only 20-30% of the cost of an overall system having argon cover gas and the xenon and krypton tags, as is more conventionally used. Another advantage of this disclosed system is that the isotopes of neon and argon are very stable and thus are not significantly changed by neutron bombardment, so that tag ratio consistency and vertification can be more easily and reliably maintained. Another major advantage of this cover gas-tag combination is the ability to more accurately resolve the neon and argon isotopes, as compared to the resolution of the heavier xenon and krypton isotope tags. Also, the recovery and analysis efforts are performed on gases that have been cleaned of radioactive fission gases to reduce personnel exposure to the radioactive isotopes of xenon and krypton. Of perhaps greatest importance, however is the fact that the cover cleanup system and the tagging gas recovery system do not compete for the same gases and/or isotopes, but operate independently of one another, so that the sensitivity and accuracy of the tagging system and the effectiveness of the cover gas cleanup system each can be greatly enhanced.

The embodiments of the invention in which an exclusive property or privilege is claimed are defined as follows:

1. In a nuclear reactor having a sealed vessel and a core therein holding fuel elements, a liquid metal coolant circulating through the core and over the fuel elements, and a cover gas confined in the vessel over the coolant, the combination of a cover gas cleanup system operable to purge the cover gas of any fission gases such as xenon and krypton that may escape from the fuel element upon a leak developing in the fuel element cladding, fuel element identification means including the encasement in the different fuel elements of selected tag isotopes blended in unique combinations relative to one another and the cataloging of the uniquely tagged fuel elements according to their locations in the core, means including a tag gas recovery and analysis system connected downstream of and in series with the gas cover cleanup system operable to receive the purged cover gas discharged therefrom, the cover gas cleanup system and the tag recovery system each having a cryogenic charcoal bed, whereby the cover gas cleanup system bed operates at a first temperature to isolate out the fission gases and the tag gas recovery system bed operates at a second temperature colder than the first temperature to recover the tag gases from the cover gas, the tag analysis system including the use of mass spectrometry for identifying the unique combinations of these isotopes and for thus locating the leaking fuel element according to the core catalog, and the cover gas being of helium and the tag isotopes being of neon and argon.

2. The nuclear reactor combination according to claim 1, wherein the cover gas cleanup system bed operates at a first temperature of between approximately 0° and $-25°$ C.

3. The nuclear reactor combination according to claim 1, wherein the tag gas recovery system bed operates at a second temperature of between approximately $-170°$ and $-185°$ C.

4. The nuclear reactor combination according to claim 1, wherein the cover gas cleanup system bed operates at a first temperature of between approximately 0° and $-25°$ C. and the tag gas recovery system bed operates at a second temperature of between approximately $-170°$ and $-185°$ C.

5. The nuclear reactor combination according to claim 1, wherein the tag isotopes are from a group including any one or more of $Ne^{20}$, $Ne^{21}$ and $Ne^{22}$.

6. The nuclear reactor combination according to claim 1, wherein the tag isotopes are from a group including any one or more of $Ar^{36}$, $Ar^{38}$ and $Ar^{40}$.

7. The nuclear reactor combination according to claim 1, wherein the tag isotopes are from a group including any one or more of $Ne^{20}$, $Ne^{21}$, $Ne^{22}$, $Ar^{36}$, $Ar^{38}$ and $Ar^{40}$.

8. The nuclear reactor combination according to claim 4, wherein the tag isotopes are from a group including any one or more of $Ne^{20}$, $Ne^{21}$, $Ne^{22}$, $Ar^{36}$, $Ar^{38}$ and $Ar^{40}$.

* * * * *